(12) United States Patent
Rüdle

(10) Patent No.: US 6,745,793 B2
(45) Date of Patent: Jun. 8, 2004

(54) VALVE ASSEMBLY COMPRISING AN INTERNAL FLOW CHANNEL WITH AN OPEN LONGITUDINAL SECTION

(75) Inventor: Manfred Rüdle, Esslingen (DE)

(73) Assignee: Festo AG & Co., Esslingen (DE)

( * ) Notice: Subject to any disclaimer, the term of this patent is extended or adjusted under 35 U.S.C. 154(b) by 28 days.

(21) Appl. No.: 10/258,040

(22) PCT Filed: Apr. 27, 2001

(86) PCT No.: PCT/EP01/04775

§ 371 (c)(1),
(2), (4) Date: Oct. 18, 2002

(87) PCT Pub. No.: WO01/83999

PCT Pub. Date: Nov. 8, 2001

(65) Prior Publication Data

US 2003/0111123 A1 Jun. 19, 2003

(30) Foreign Application Priority Data

May 3, 2000 (DE) .......................................... 100 21 518

(51) Int. Cl.⁷ ................................................. F15B 13/08
(52) U.S. Cl. .................................. 137/596.16; 137/884
(58) Field of Search ............................. 137/596.16, 884

(56) References Cited

U.S. PATENT DOCUMENTS 2,871,887 A * 2/1959 Obrebski et al.
4,770,210 A * 9/1988 Neff et al.
5,289,634 A * 3/1994 Makino et al.
5,341,846 A * 8/1994 Framberg

FOREIGN PATENT DOCUMENTS

| CH | 686975 A5 | * | 8/1996 |
| DE | 3824844 A1 | * | 2/1989 |
| DE | 4223298 A1 | * | 2/1993 |
| DE | 4324939 C2 | * | 1/1995 |
| EP | 0628729 A1 | * | 12/1994 |
| EP | 0719949 A2 | * | 7/1996 |
| EP | 0822340 A1 | * | 2/1998 |
| EP | 0643811 B1 | * | 3/1998 |
| EP | 0678676 B1 | * | 1/1999 |
| EP | 0915275 A2 | * | 5/1999 |

* cited by examiner

Primary Examiner—Gerald A. Michalsky
(74) Attorney, Agent, or Firm—Hoffmann & Baron, LLP

(57) ABSTRACT

A valve arrangement, which possesses a plurality of valve units mounted on each other in sequence in an array direction (3) on each other. For this purpose each valve unit (2) possesses, on opposite sides, a first mounting face (5) and a second mounting face (6). In the interior of each valve unit (2) there extends, in a direction athwart the array direction (3), at least one internal flow duct (32a and 32b). On its longitudinal side, facing the first mounting face (5), same is delimited by a lateral duct wall (36a and 36b) of the respective valve unit (2). On the opposite longitudinal side it is at least partially open, the open length section (37a and 37b) being covered by the mounted neighboring valve unit. Accordingly compact width dimensions are possible.

16 Claims, 3 Drawing Sheets

VALVE ASSEMBLY COMPRISING AN INTERNAL FLOW CHANNEL WITH AN OPEN LONGITUDINAL SECTION

This application claims priority from German Application No. 10021518.1 filed on May 3, 2000.

FIELD OF THE INVENTION

The invention relates to a valve arrangement comprising a plurality of valve units which on mutually opposite sides have a respective mounting face and which for forming a subassembly are arranged in an array direction one after the other and with facing mounting faces turned toward each other side by side, each valve unit containing at least one internal fluid duct extending athwart the array direction.

BACKGROUND OF THE INVENTION

A valve arrangement of this type is for example disclosed in the European patent publication 0 678 676 B1. It comprises a plurality of tabular valve units, which are clamped together by ties as a subassembly, adjacent valve units resting against each other at mutually facing mounting faces. Each valve unit comprises a valve means able to control the fluid flow in the power ducts which open at an outer face, aligned athwart the array direction of the valve units. The supply of fluid and escape thereof as regards the valve units is by way of fluid ducts, which extend through the individual valve units in the array direction and are aligned with each other.

As part of attempts to miniaturize the prior art valve arrangement it has been found that in the array direction a certain minimum size can not be gone below if the desired fluid cross sections are to be ensured.

SUMMARY OF THE INVENTION

Accordingly one object of the present invention is to create a valve arrangement of the type initially mentioned which may be designed with smaller overall sizes without impairing functionality.

In order to achieve this object there is a provision such that at least one of the internal flow ducts is delimited on a first longitudinal side, which faces the first mounting face, by a lateral duct wall of the respective valve unit and on its second longitudinal side, which faces the other, second mounting side, is open along a length section extending at least for part of its length, the open length section being covered by the lateral duct wall of the adjacent valve unit mounted on the second mounting side.

This means that flow ducts having a larger width than in the prior art may be produced extending in the interior of the valve units athwart the array direction. Only one of the two duct walls delimiting the respective flow duct at the mounting sides on the longitudinal side is a direct component of the valve unit containing the flow duct. The opposite duct wall is on the other hand constituted at least partially by the mounted adjacent valve unit so that the flow duct may extend within the associated valve unit on a longitudinal side as regards its width as far as the next mounted valve unit. It is in this manner that the overall width of the valve units may be reduced without impairing the flow cross section of the respective internal flow duct. A further advantage resulting from this special-purpose design structure is that even relatively complicated, non-linear internal flow ducts may be produce extremely simply, since such flow ducts may be formed from the corresponding mounting side as groove-like recesses, for example in the case of casting the respective components of the valve units.

For example the German patent publication 4,324,939 C2 and the European patent publication 0 643 811 B1 have already disclosed providing valve units with a longitudinally divided housing, which in the parting plane has groove-like recesses, which in the assembled state of the housing compliment each other to form flow ducts. There is in this case however no interaction such that a valve housing at the same time performs a housing function as regards the adjacent valve unit. As disclosed in the U.S. Pat. No. 5,341,846 even in the case of valve units having longitudinally split housings designers adhered to a individual conventional array, even when it was a question of collecting a plurality of valve units together as a valve arrangement in a subassembly.

Further advantageous developments of the invention are defined in the dependent claims.

At least one internal flow duct having an open length section preferably constitutes a power duct in the respective valve unit, which, starting at one valve means extends to an outer face of the valve unit running athwart the array direction, where connection means are associated with it, which render possible the connection of a fluid line leading to a load. The open length section may moreover extend along the entire duct length or only a part of the respective flow duct, independently of the type of associated flow duct. In this connection at least one internal flow duct may possess, following its open length section, a peripherally completely closed length section, by way of which for example the connection of a fluid duct leading to other equipment is possible directly or indirectly. Since the flow duct is completely closed adjacent to connection opening peripherally, it is possible to readily provide a sealed connection to further duct or line means leading to further equipment.

In the case of a particularly convenient design of the valve arrangement the valve units respectively have a main body, which is fitted with a valve means and wherein the at least one internal flow duct having an open length section extends. The valve means is in this case preferably integrated in the main body.

Particularly compact dimensions may be ensured if the valve units respectively have a tabular or plate-like configuration.

In the array direction each valve unit can have one or more fluid ducts extending through it, which respectively communicate on the one hand with a valve means of the respective valve unit and on the other hand communicate with corresponding fluid ducts of the respectively adjacent valve unit in order to create a fluid connection extending through all valve units, such fluid connection rendering possible a common supply and removal of the pressure medium necessary for operation.

Between adjacent valve units it is convenient to provide sealing means, which in the peripheral region of the mutually communicating openings of the fluid ducts and in the peripheral region of the open length section of the at least one internal flow duct are responsible for a hermetic sealing action between adjacent valve units. These sealing means may for instance be constituted by a uniform sealing element placed between adjacent valve units.

By having interlocking centering means on adjacent valve units assembly with the desired relative position of the valve units may be facilitated.

It is furthermore expedient for the first mounting face associated with the lateral duct wall the valve units to be an even smooth surface, something rendering possible extremely simple manufacture. To the extent that groove-like recesses are necessary to accommodate sealing means, such recesses will be preferably on the second mounting face of the respective valve unit for which the open length section or sections of one or more internal flow ducts are provided.

In the following the invention will be described in detail with reference to the accompanying drawings.

BRIEF DESCRIPTION OF THE INVENTION

DETAILED DESCRIPTION OF THE PREFERRED EMBODIMENTS

The illustrated valve arrangement 1 comprises a plurality of valve units 2 preferably having a tabular flat shape, which are arranged one after the other in an array direction 3 indicated in chained lines with the formation of a subassembly-like unit and are fixedly joined together.

Figure 1:
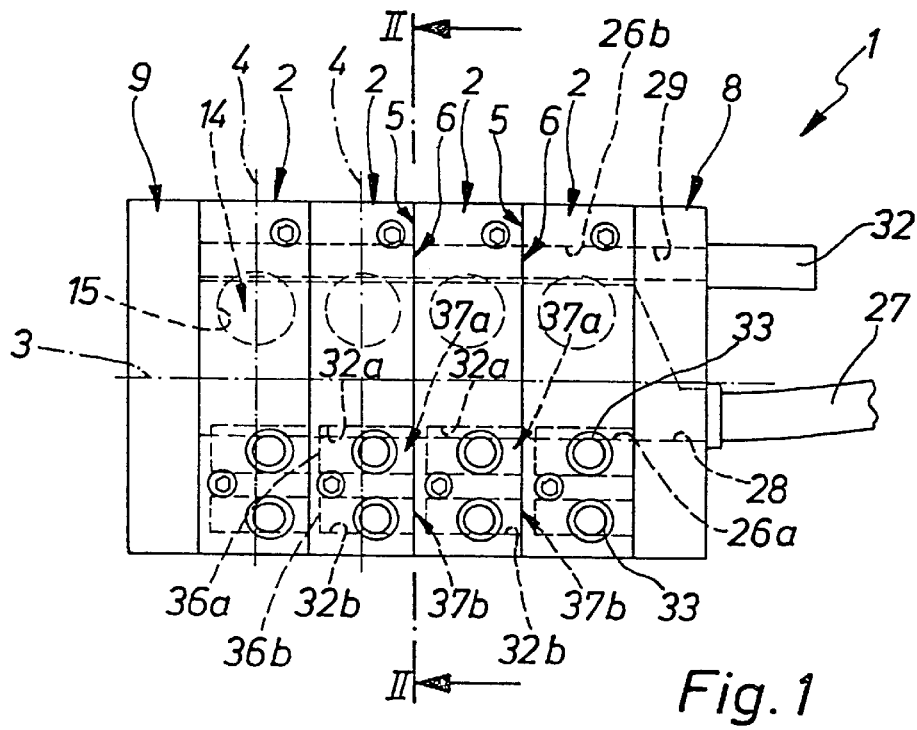
FIG. 1 shows a first design of the valve arrangement in accordance with the invention as seen from the front looking as indicated by the arrow I in FIG. 2.

The individual valve units 2 are so aligned that their planes 4 of extent indicated in chained lines in FIG. 1 are at a right angle to the array direction.

On its oppositely facing sides with a large area each valve unit 2 has first and, respectively, second mounting faces 5 and 6, as considered in the array direction 3 directly adjacent valve units 2 being fitted together at facing mounting faces with intermediate sealing means 7. The row of valve units 2 is at one end flanked by a first terminating body 8 and at the other end by a second terminating body 9, which is mounted on the outer side, facing in the array direction 3, of the respectively associated last and, respectively, outer valve unit 2.

The outline appearing on looking in the array direction 3, of the valve units 2 and of the terminating bodies 8 and 9 is preferably identical, a rectangular configuration being preferably selected so that the valve arrangement 1 may have a block-like and more particularly cubic shape.

The components put, together side by side in the manner indicated, of the valve arrangement 1 are joined together firmly while at the same time being detachable. Preferably, the above mentioned components are clamped together in the array direction 3, something which may be ensured by ties 12 indicated in FIG. 2, such ties extending through the individual tabular components and being secured at both terminal terminating bodies 8 and 9.

The individual, preferably tabular or slab-like, valve units 2 are respectively of multi-part design in the working example. The principal component is a main body 13, which again is tabular, and is fitted with a valve means 14, such valve means being accommodated in the interior of the main body 13 in the working embodiment so that in this respect there is an integrated structure.

Figure 2:
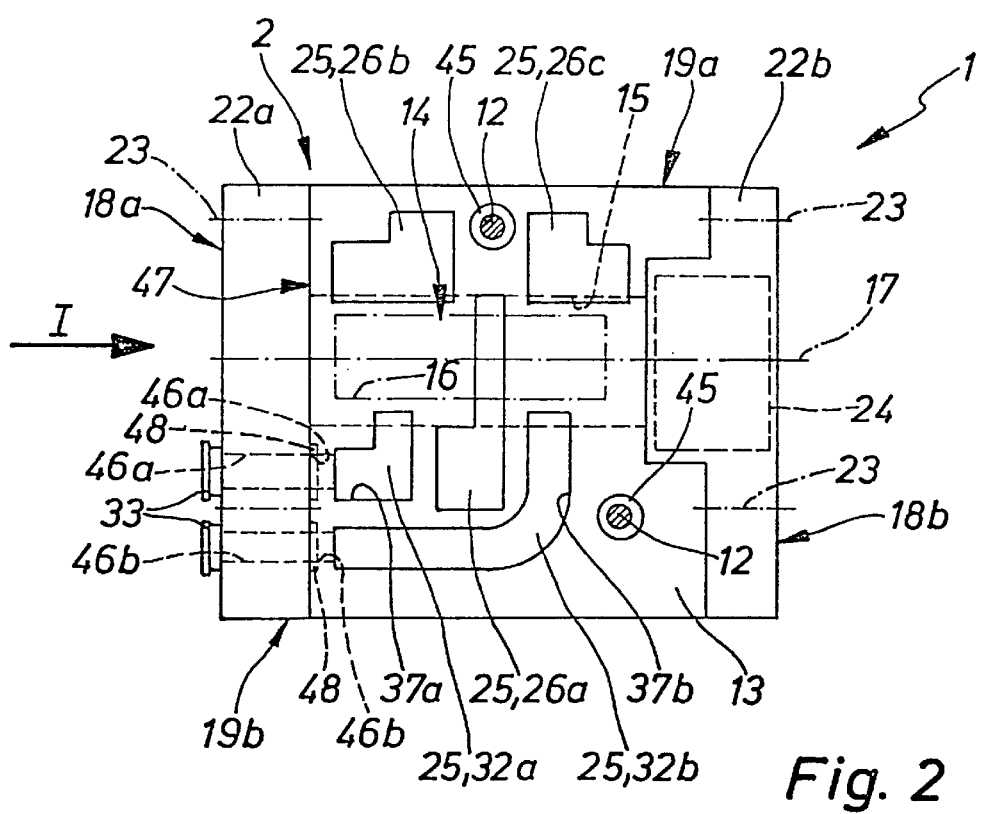
FIG. 2 is a diagrammatic representation of a cross section taken through the valve arrangement of FIG. 1 on the section line II—II at the join between two valve units placed together, the direction of view being the same as that indicated in FIG. 3 by the arrow III.

Preferably, the valve means 14 comprises an elongated socket 15 constituted by a cavity in the main body 13, in which cavity a valve member 16 is received in a moving fashion, such member 16 member being indicated in FIG. 2 in chained lines. The valve means 14 preferably has a longitudinal extent and is so aligned that its longitudinal axis 17 runs within or parallel to the plane 4 of extent of the respective valve unit 2. The longitudinal axis 17 in this case intersects with mutually opposite outer faces, which are aligned athwart the array direction 3, of the associated valve unit 2, that in the following will be referred to as the front and rear outer faces 18a and 18b for the sake of ease of description.

Owing to its rectangular form each valve unit 2 in the working example has two further outer faces which extend at a right angle to the above mentioned outer faces 18a and 18b and which for convenience of description will be termed the top and bottom outer face 19a and 19b. The present details as regards alignment only relate to a preferred alignment of the valve arrangement 1 and are consequently not to be understood with a limiting interpretation.

On the narrow front and rear sides of the main body 13 there is, in the case of present working example, a respective front and, respectively, rear additional body 22a and 22b, mounted firmly in place, such mounting being for example by the intermediary of attachment screws which in FIG. 2 are indicated in chained lines 23. The front and the rear outer face 18a and 18b of a respective valve unit 2 is located on the outer side, opposite to the main body 13, of the respective front and, respectively, rear additional body 22a and 22b.

Figure 3:
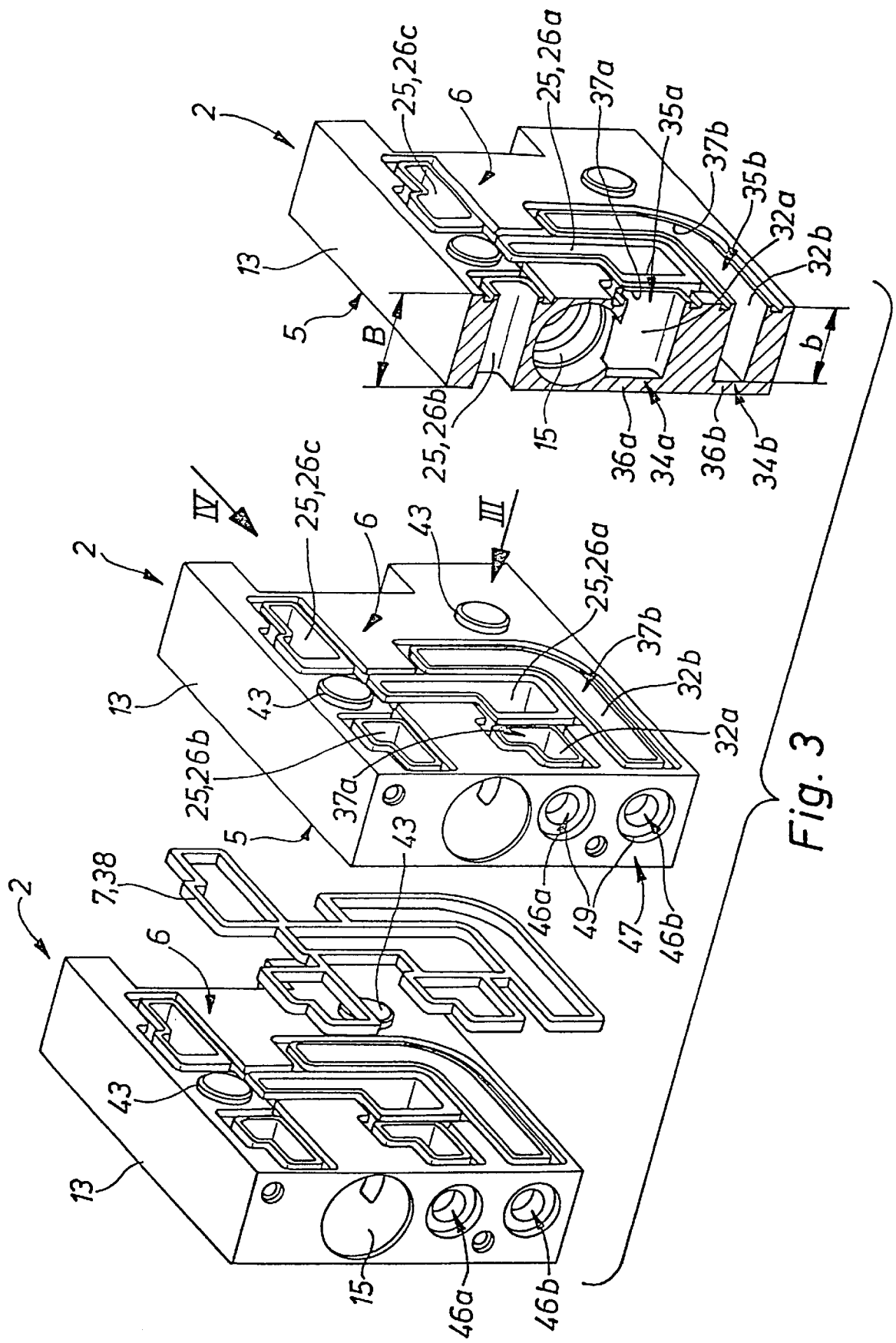
FIG. 3 is a view of part of the valve arrangement of FIGS. 1 and 2 as an exploded representation of tabular main bodies of three valve units, partly sectioned, a preferred embodiment of a sealing element to be placed between adjacent valve units being indicated.
Figure 4:
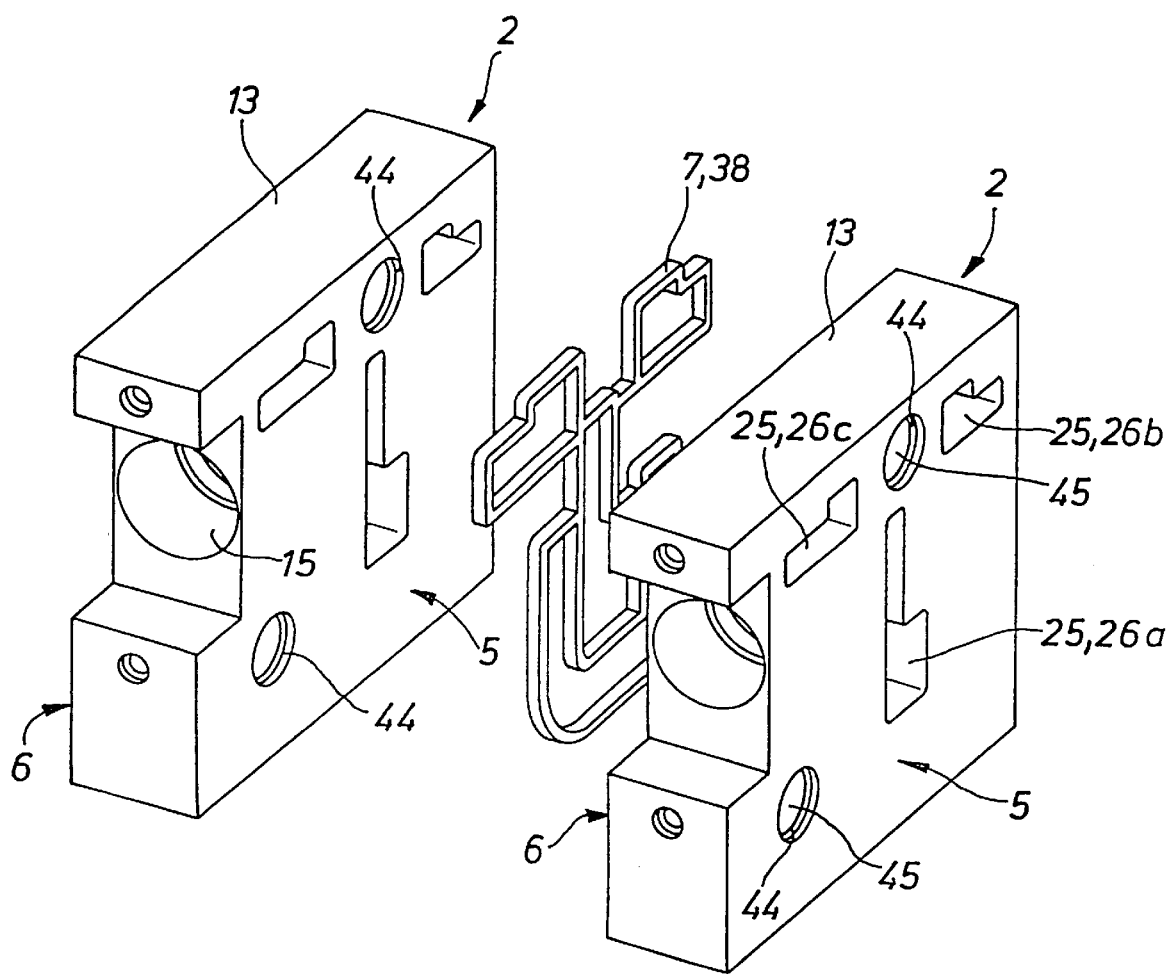
FIG. 4 shows the arrangement of the two valve units, indicated on the left in FIG. 3 together with an intermediately placed sealing element in a rear elevation looking generally in the direction of the arrow IV in FIG. 3.

In the FIGS. 3 and 4 only the main body 13 of the valve units 2 is illustrated.

The rear additional body 22a constitutes a support for a valve drive means 24, which is only indicated in chained lines, able to be electrically activated. Using it, there is the possibility of operating the valve means 24 as may be required and more particularly of setting the valve member 16, not illustrated in FIGS. 3 and 4, in different switching positions within the socket 15.

If necessary the valve drive means 24 could be completely or partially provided in or on the front additional body 22a.

The valve drive means 24 may comprise one or more control valves, as for instance in the form of microvalves and/or piezoelectrically operated valves of extremely small size.

In a manner dependent on the state of switching of the valve means 14 it is possible, within the respective valve unit 2, for different ducts 25, which serve to conduct a pressure medium, more particularly compressed air, to be linked with each other in different ways. Among such ducts 25 there are several fluid ducts 26a, 26b and 26c, in the present case three of them, which extend through the respective valve unit 2 in its main body 13 in the array direction 3 so that they open at the two respective mounting faces 5 and 6 of the respective valve unit 2. When the valve units 2 are placed again each other, the openings of the above mentioned fluid ducts of adjacent valve units 2 are opposite and in line with each other, respectively, so that there is a number of through ducts corresponding to the number of fluid duct 26a, 26b and 26c such through ducts running through all valve units 2. Owing to the above mentioned sealing means 7 it is possible to ensure there is a transition, which is sealed off from the outside, between the individual valve units 2. The sealing means 7 are located respectively in the peripheral portion of the openings, which communicate with each other, of respectively associated fluid ducts 26a, 26b and 26c of the individual valve units 2 and surround same.

In the working embodiment illustrated the first fluid ducts 26a are in the form of supply ducts which render possible central supply to all valve 2 units as regards the pressure medium to be distributed. The latter is for example supplied by way of a fluid line 27, which is able to be connected to the first terminating body 8 and is connected with a through opening 28 of the same, which communicates with the supply duct 26a of the first valve unit 2.

The two other fluid ducts 26b and 26c are in the working example designed in the form of venting ducts and communicate with further through opening 29 in the first terminating body 8, by way of which they are able to be connected with the atmosphere. In this case it is possible for the further through openings 29 on the first terminating body 8 to be connected with a muffler 32 in order to reduce the noise of the exiting flow.

The oppositely arranged second terminating body 9 merely has a cover function in the working embodiment. However, it will be clear that the through openings 28 and 29 could be at least partially provided on the second terminating body 9.

The fluid ducts 26a and 26b are directly connected within a respective main body 13 with the socket 15 of the respective valve means 14.

Among the ducts 25 of a respective valve unit 2, which are at one end connected with the socket 15, there are furthermore at least one and preferably a plurality of internal flow ducts 32a and 32b, (three in the present case) which run in the interior of the valve units 2 athwart the array direction 3. Dependent on the design their longitudinal shape is linear or at least partly non-linear and they run more particularly in the plane 4 of extent as far as the front outer face 18a aligned athwart the array direction 3. Since the internal flow ducts 32a and 32b in the working example constitute power ducts, by way of which load adapted for fluid power operation may be operated, connection means 33 are provided for their openings located on the front outer face 18a, such means 33 allowing a detachable connection of the fluid ducts leading to the respective loads. The connection means 33 may more especially be in the form of plug connecting means.

By suitable operation of the valve means 14 it is possible for the internal flow ducts 32a and 32b to be selectively connected with the supply duct 26a or a venting duct 26b and 26c in order to supply the connected load with pressure medium or to vent it.

The entire cross section of the internal flow ducts 32a and 32b is within the respectively associated valve unit 2. Using special measures there is however the possibility even in the case of a small overall width of "B" of the individual valve units 2 to have relatively large duct widths of "b" for the internal flow ducts 32a and 32b. The width dimensions are in this case to be understood as being measured in the array direction 3. By adopting a suitable measure it is also possible even with small overall widths of "B" for the individual valve units 2 to provide sufficient flow cross sections, something rendering possible the provision of valve arrangements 1 with extremely small dimensions. For instance, it is possible to have an overall width of "B" of the order of 7 mm.

The relevant measures are such that the internal flow ducts 32a and 32b are delimited at their first longitudinal side 34a and 34b facing the first mounting face 5 by a lateral duct wall 36a and 36b, in the case of which it is a question of a direct component of that valve unit 2, wherein the respective internal flow duct 32a and 32b extends.

On the second longitudinal side 35a and 35b facing the other, second mounting side 6 on the other hand the internal flow ducts 32a and 32b are open at least part of their length as a length section, the corresponding duct section being termed an open length section 37a and 37b. At the open length section 37a and 37b the respective internal flow duct 32a and 32b is in the form of groove-like recess open toward the second mounting face 6. As part of manufacture by casting or injection molding it is hence possible for forms of the internal flow ducts 32a and 32b to be produced relatively simply with complex configurations in the length direction. More particularly there is the possibility of so selecting the duct form that the volume of the valve unit 2 is optimally utilized, something which renders possible having compact external dimensions.

In order to ensure that the internal flow ducts 32a and 32b are also closed along their open length section 37a and 37b, there is a provision such that their open length section 37a and 37b is covered over by the lateral duct wall 36a and 36b of the adjacent valve unit 2 mounted on the second mounting side 6. The lateral duct wall 36a and 36b of a respective valve unit 2 accordingly performs a double function, since it on the one hand serves for laterally delimiting the internal flow ducts 32a and 32b of the associated valve unit 2, while simultaneously functioning as well as a duct wall for the open length sections of the internal flow ducts of the adjacent valve unit 2 mounted on the first mounting face 5. It is an advantage in this respect that within a respective valve unit 2 only one sheet wall thickness is necessary for the flow ducts 3 limiting on the longitudinal side and accordingly the duct width of "b" may assume the greater part of the overall width of "B" of the valve unit 2.

The sealing means 7 provided between adjacent valve units 2 serve to provide for a hermetic sealing off between the adjacent valve units 2 in the peripheral portion of the open length sections 37a and 37b. In this connection it is advantageous if the respective sealing means are made integral with the sealing means provided for sealing off the transition zone between the fluid ducts 26a and 26b, a respectively single sealing element 38, placed between adjacent valve units 2, as illustrated, constituting the sealing means 7. The sealing element 38 may be designed in the form of a gasket, it also possibly being a question of a sealing board.

Preferably each respective valve unit 2 has accommodating grooves 42 on the second mounting face 6, into which the sealing means 7 may be inserted. The first mounting face 5 on the other hand is, as depicted in FIG. 4, preferably smooth as regards its surface and even.

In order to make possible a simple assembly of the valve units 2 in the proper locations the first and second mounting faces 5 and 6 are provided with mutually complementary first and second centering means 43 and 44, which when adjacent valve units 2 are placed together may interlock with one another. The one set of centering means are in the working example in the form of projections whereas other centering means are in the form of complementarily shaped recesses.

The valve units 2 may have passages 45, which preferably extend within the first and the second centering means 43 and 44 and through which the ties 12 may be put. This means that there is a coaxial arrangement of the ties 12 and the centering means 43 and 44, something which leads to a further saving in overall volume.

It would be in principle possible to have the open length section 37a and 37b extending along the entire length of the flow duct 32a and 32b. Taking into account that terminating means 33 are normally provided at the outer ends of the internal flow ducts 32a and 32b, which render possible a hermetic connection of fluid ducts or lines leading to other equipment, it is however convenient for at least the outer end portion, opposite to the valve means 14, of each internal flow duct 32a and 32b to be designed completely closed along the entire length thereof, the duct wall being completely constituted by the associated valve unit 2. The corresponding section is here termed a closed length section 44a and 44b and it may, dependent on the overall length, lead to a connection opening or it may itself constitute such a connection opening. It is in any case an advantage for the length of the closed length section 46a and 46b to be as small as possible so that the open length section 37a and 37b runs along the major part of the length of the respective flow duct 32a and 32b.

In the working embodiment illustrated the internal flow ducts 32a and 32b are so arranged and designed that their inner end portion extends from one longitudinal side of the valve means 14 or, respectively, its socket 15 and runs in a non-linear extent thereof, not illustrated, to the front outer face 18a. The longitudinal extent thereof is here more particularly made with a sharp bend or is arcuate, at least the non-linear sections being in the form of open length sections 37a and 37b. These open length sections 37a and 37b are limited to the main body 13 and extend from the inner end portion of a respective internal flow duct 32a and 32b to a point just short of a front outer face 47 of the main body 13, on which the front additional body 22a is mounted. At a short closed length section 46a and 46b the internal flow ducts 32a and 32b open at the front outer face 47. Thence the internal flow ducts 32a and 32b are continued as further closed length sections 46a and 46b which extend through the respective additional body 22a and are provided with the connection means 33. In the transitional zone between the main body 13 and the front additional body 22a, between the mutually aligned closed length sections 46a and 46b, annular seals 48 are placed in order to create a hermetic joint. The front mounting face 47 can be provided with an annular bulge 49 in order to receive seals 48 in the peripheral part of the closed length section 46a and 46b.

It would certainly be possible to associate the connection means 33 directly with the closed length section 46a and 46b of the adjacent to the internal flow ducts 32a and 32b at the front outer face 47 of the main body 13 and to do without any additional body 22a.

All in all it is possible to say that in the case of the valve arrangement 1 the overall width of the individual valve units 2 may be optimally employed for such internal flow ducts, which run in the plane of extent of the respective valve unit 2, whose longitudinal extent hence runs athwart the array direction 3 and more especially parallel to the mounting faces 5 and 6. The internal flow ducts 32a and 32b may be open on the longitudinal side facing one of the mounting faces 6, the adjacent valve unit mounted on the mounting face performing a cover function and covering and sealing off the open mounting face 5. When the valve units 2 are mounted together the lateral duct wall 36a and 36b, which in the working example is formed integrally with the respective main body 13, accordingly performs a double function since its inner face delimits the internal flow duct 32a and 32b of the associated valve unit 2 while its outer face, coinciding with the first mounting face 5, performs the task of longitudinally delimiting the internal flow ducts 32a and 32b of the adjacent valve unit 2.

The design, which is at least partially open on the longitudinal side, of the internal flow ducts is not restricted to flow ducts, which as in the working embodiment function as power ducts. The principle can be extended to other functions in the same fashion, as for instance to pilot control ducts, which serve to cause pressure medium to act on the valve member 16 in order to alter its this position of switching.

At least as regards the main body 13, the valve units 2 preferably consist plastic material or metal, as for example aluminum material. Such materials render possible advantageous manufacture by injection molding or injection casting.

What is claimed is:

1. A valve arrangement, comprising a plurality of valve units, which on opposite sides thereof respectively have a mounting face and which with the formation of a subassembly are arranged in an array direction one after the other and thereby are mounted side by side with mounting faces thereof facing each other, each valve unit possessing two internal flow ducts running athwart the array direction and designed in the form of power ducts, such ducts extending from a valve means of the respective valve unit to one and the same outer face, aligned athwart the array direction of the valve unit, where connection means for the connection of a fluid duct leading to other equipment are provided, characterized in that the two internal flow ducts are delimited at their first longitudinal side, facing the first mounting face, by a respective lateral duct wall of the respective valve unit and at their second longitudinal side, facing the other second mounting side, are open along a length section extending at least along a part of their length, and the open length sections have a sharply bent or arcuate shape in the length direction thereof and are covered by the lateral wall of the neighboring valve unit mounted on the second mounting side.

2. The valve arrangement as set forth in claim 1, characterized in that following its open length section at least one internal flow duct has a peripherally completely closed length section, which may lead to or form a connection opening.

3. The valve arrangement as set forth in claim 1, characterized in that the open length section runs along the major part of the length of the respective internal flow duct.

4. The valve arrangement as set forth in claim 1, characterized in that the valve units respectively possess a main body which is fitted with a valve means and in which the two internal flow ducts run, which possess an open length section.

5. The valve arrangement as set forth in claim 4, characterized in that the two internal flow ducts having an open length section extend between the valve means and an outer face, which is aligned athwart the array direction, of the main body.

6. The valve arrangement as set forth in claim 5, characterized in that the valve means has a longitudinal extent, and the two internal flow ducts, which have an open length section, run laterally from the valve means and as part of an at least partially non-linear longitudinal extent run to an outer face, which is so placed that a normal to its face is parallel to the longitudinal axis of the valve means.

7. The valve arrangement as set forth in claim 5, characterized in that an additional body is mounted on the outer face of the main body and in such additional body the internal flow ducts are continued respectively in the form of a length section which is peripherally closed.

8. The valve arrangement as set forth in claim 4, characterized in that the valve means are accommodated in the interior of the main body of the respective valve unit.

9. The valve arrangement as set forth in claim 1, characterized in that the valve units respectively have a tabular shape, their planes of extent extending perpendicularly to the array direction.

10. The valve arrangement as set forth in claim 1, characterized in that each valve unit has one or more fluid ducts extending in it in the array direction, such fluid ducts communicating with a valve means of the respective valve unit, the fluid ducts of neighboring valve units being connected together to form through ducts.

11. The valve arrangement as set forth in claim 10, characterized in that between neighboring valve units sealing means are arranged which in the peripheral zone of the mutually communicating openings of the fluid ducts and in the peripheral zone of the open length section of the two internal flow ducts are responsible for a hermetic sealing action between neighboring valve units.

12. The valve arrangement as set forth in claim 11, characterized in that the sealing means are constituted by a sealing element placed between neighboring valve units.

13. The valve arrangement as set forth in claim 1, characterized by centering means, interlocking with each other, on adjacent valve units.

14. The valve arrangement as set forth in claim 1, characterized in that the valve units have first mounting faces which are smooth and even.

15. The valve arrangement as set forth in claim 1, characterized in that at its open length section at least one internal flow duct is in the form of a groove-like recess open toward the second mounting face.

16. The valve arrangement as set forth in claim 1, characterized in that the two outer valve units are flanked at their outer side by a respective terminating body.

\* \* \* \* \*